Figure 1:
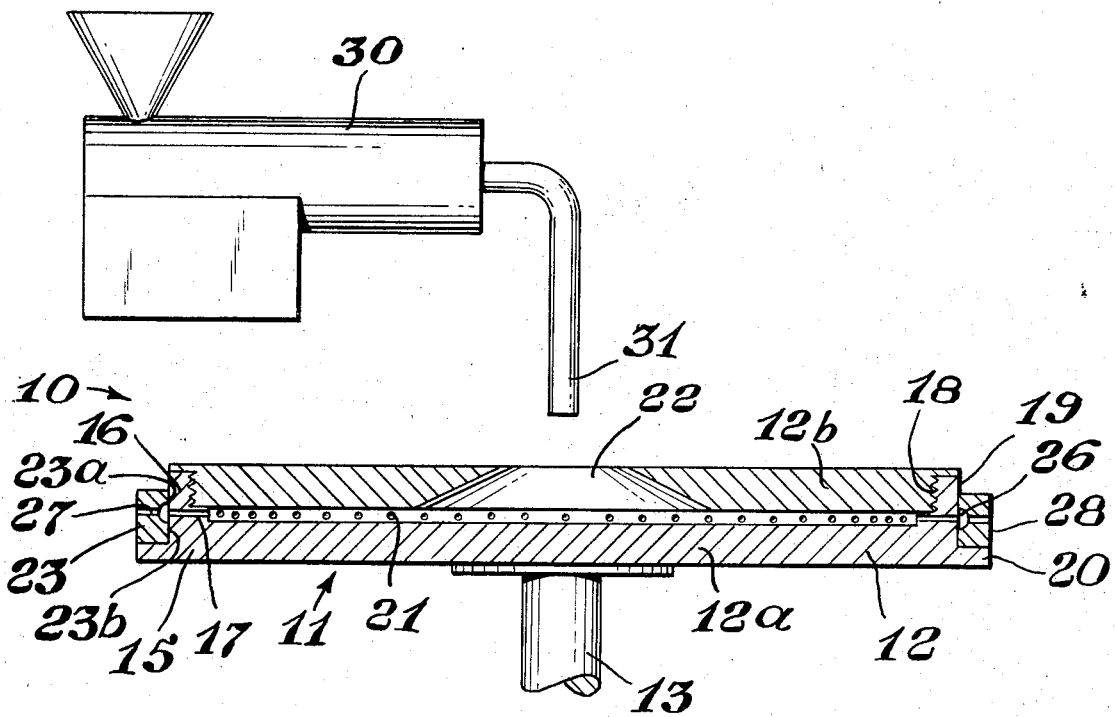

United States Patent

Chisholm

[15] 3,697,211

[45] Oct. 10, 1972

[54] EXTRUSION DIE
[72] Inventor: Douglas S. Chisholm, Midland, Mich.
[73] Assignee: The Dow Chemical Company, Midland, Mich.
[22] Filed: Aug. 13, 1970
[21] Appl. No.: 63,546

[52] U.S. Cl. ..................425/191, 29/447, 65/1, 76/107 A, 425/382, 425/192
[51] Int. Cl. ...............................................B29f 3/04
[58] Field of Search.18/12 DM, 12 C, 12 DR, 12 DS, 18/8 SM, 8 SS, 8 G; 264/8; 65/1; 76/107 A, 107 S; 29/447 X

[56] References Cited

UNITED STATES PATENTS 2,146,995 2/1939 Simons ....................76/107 A
3,483,281 12/1969 Chisholm...................264/8 X
2,733,380 1/1956 Phillips et al. ............29/447 X
3,115,696 12/1963 Evans ......................29/447 X
3,296,662 1/1967 Raley...................18/12 DM X

*Primary Examiner*—J. Spencer Overholser
*Assistant Examiner*—Michael O. Sutton
*Attorney*—Griswold & Burdick, Richard G. Waterman and Robert B. Ingraham

[57] ABSTRACT

Extrusion dies are prepared from diverse materials having diverse thermal coefficients of expansion in such a manner that the die plate is held to the die body by the differential thermal expansion or contraction of the die as it attains operating temperature.

3 Claims, 2 Drawing Figures

PATENTED OCT 10 1972  3,697,211

INVENTOR.
Douglas S. Chisholm
BY Robert B. Ingraham
AGENT

EXTRUSION DIE

Extrusion dies are widely used for the processing of synthetic resinous thermoplastics as well as other plastic materials. Frequently in many extrusion systems, particularly where the extrude has a relatively small cross-sectional area, such as in the preparation of fibers, strands or the like, it is necessary to frequently disassemble the die or detach the die from the extrusion apparatus and change a filtering medium. Generally within an extrudable melt, greater or lesser amounts of contamination are present. Many of the contaminants are solid or semi-solid materials which oftentimes are not thermoplastic at the temperature of extrusion, or are not as thermoplastic as the material which is being extruded. Frequently, filters or die orifices accumulate a sufficient amount of such materials which may be external contamination; that is, contamination foreign to the extrude, or internal contamination, such as thermal decomposition products of the material being extruded. Such material must be removed when it accumulates to a sufficient degree to interfere with the extrusion operation. Oftentimes, substantial difficulty is encountered in removing contamination from a die due to complex geometry or inconvenient manner of assembly which requires various fastenings to be released before the die can be suitably disassembled.

It would be desirable if there were available an improved extrusion die which could be quickly and easily disassembled for cleaning.

It would also be desirable if there were an improved extrusion die which could be assembled and disassembled with a minimal requirement of tools.

It would further be desirable if there were available a readily assembleable and disassembleable die of simple construction which could be cleared of contamination with minimal mechanical disarrangement.

These benefits and other advantages in accordance with the present invention are achieved in an extrusion die particularly suited and adapted for the extrusion of heat plastified synthetic resinous materials at an extrusion temperature at least 80°C. above ambient temperature, the extrusion die comprising in cooperative combination a die body defining a cavity therein, the die body defining a passageway to permit entry therein of heat plastified material, a die plate defining at least one extrusion orifice in operative combination with the die body, the die plate and die body being of materials having diverse coefficients of expansion, the die plate and die body being readily placed in mating relationship when the die body is at least 50°C. below the extrusion temperature, at the extrusion temperature the die body and die plate exhibiting an interference fit, the die body defining an extrude receiving cavity, the extrude receiving cavity being in operative communication with the die opening.

Further features and advantages of the present invention will become more apparent from the following specification taken in connection with the drawing wherein:

FIG. 1 schematically depicts a cross-sectional view of a die in accordance with the present invention.

Figure 2:
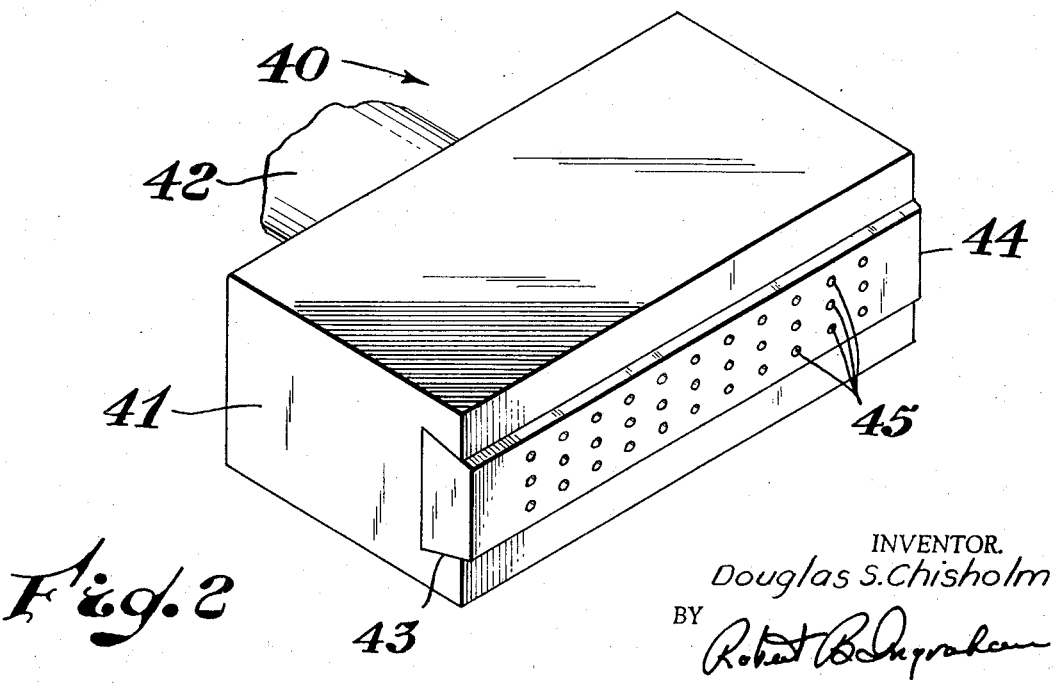

FIG. 2 depicts an alternate embodiment of the invention.

In FIG. 1 there is schematically depicted an extrusion apparatus in accordance with the invention generally designated by the reference numeral 10. The extrusion apparatus 10 comprises in cooperative combination a rotary or centrifugal die generally designated by the reference numeral 11. The centrifugal die 11 comprises a generally plate-like circular body 12 rotatably supported and driven by a centrally disposed driving means or support shaft 13 beneficially driven by a motor or like source of rotational energy, not shown. The body 12 comprises a first or base portion 12a affixed to the support shaft 13 and a second or cap portion 12b affixed to the base portion 12a. The base portion 12a has a generally discoidal configuration and an outer or peripheral region 15. The peripheral region 15 defines a generally axially extending flange 16 which in turn defines a plurality of generally radially outwardly disposed openings 17. The cap portion 12b is of a generally annular configuration and is affixed to the portion 12a by means of a threaded connection 18 adapted to engage a mated threaded surface of the flange 16. The flange 16 defines a generally cylindrical external surface 19 and a locating shoulder or stop means 20. The portions 12a and 12b define an internal generally annular cavity 21 in full communication with the openings 17. The upper or cap portion 12b defines a centrally disposed feed opening 22 in full communication with the cavity 21. A die plate or ring 23 of generally annular configuration is disposed about the flange 16 and in generally sealable engagement with the surface 19. The die plate or ring 23 has inner annular surfaces 23a and 23b adapted to mate with the surface 19 of the flange 16. The die ring 16 defines an annular groove 26 and a plurality of extrusion passages 27. The extrusion passages as depicted in FIG. 1 are of a stepped configuration wherein the larger diameter portion of the passage is in communication with the annulus 26 and with an external surface 28 of the die ring 23. An extrudable material supply means 30 is disposed generally adjacent the opening 22 and is adapted to supply heat plastified material to the opening 22 by the discharge means 31.

It is essential and critical to the embodiment of the present invention set forth in FIG. 1 that the die ring 23 be made of a material which has a coefficient of thermal expansion less than the coefficient of thermal expansion of the body portion 12a. Thus, at lower or ambient temperatures, such as between 15° to 35°C., the ring 23 may slide over the surface 19 of the flange 16 without requiring substantial mechanical force. However, when the centrifugal die is heated to an extrusion temperature, such as a temperature from about 80° to 300°C., the body 12a expands to a dimension greater than does the ring 23 when heated to a similar temperature and unsupported by the flange. Thus, the flange 16 exerts a substantial force on the ring 23 attempting to radially expand the ring, giving rise to an interference fit at extrusion temperatures and permitting ready disassembly when the die body is cooled or returned to lower temperatures. Beneficially, the second portion 12b of the body 12 is joined to the portion 12a in a convenient manner such that the relative thermal expansion of the portions 12a and 12b does not affect the diameter of the flange, or if a lightweight structure is required wherein the flange 16 is constructed of a relatively thin material, the portion 12b is constructed of a material having a coefficient of expansion greater than the material of the base 12a and the ring 23, thus providing a force on heating of the die which tends to increase the diameter of the flange 16 at a location remote from the retaining shoulder 20 and thus more firmly lock the ring 23 into position. Centrifugal extrusion is well known in the art. One particular method is set forth in U.S. Letters Pat. No. 3,483,281, herewith incorporated by reference.

If, in certain instances the die is subject to substantial vibration in operation which may be encountered on startup or shutdown, it is desirable that the dimensions of the body and die ring be selected to provide an interference fit at both ambient and extrusion temperatures wherein the amount of interference is substantially greater at extrusion temperature than at room temperature. Removal of the ring is accomplished by warming the ring to a predetermined temperature (preferably not over the decomposition temperature of the material within the die) above the body temperature and then sliding the die ring from the body.

In FIG. 2 there is set forth an alternate embodiment of the invention generally designated by the reference numeral 40. The embodiment 40 comprises a die body 41 defining therein a die cavity, not shown. The die cavity is in operative combination with a source 42 of heat plastified material. The die body 41 defines therein an externally outwardly tapering dovetail slot 43, the dovetail slot being in operative communication with the die cavity. Disposed within the dovetail slot 43 is a mating dovetail die plate 44. The die plate 44 has a plurality of extrusion orifices 45 therein providing communication between the die cavity 42 and space external to the apparatus 40.

The die body 41 of the apparatus 40 is constructed of material having a coefficient of expansion less than the material employed for the die plate 44. At ambient temperatures, the die plate 44 is a sliding fit for the dovetail slot 43. The dimensions and coefficient of expansion are chosen in such a manner that as the temperature of the die body 41 and the die plate 44 increase, for example, to a temperature up to 100°C., an interference fit is obtained. Thus, tight sealing of the die plate into the die block is achieved at extrusion temperatures. On cooling of the die and die plate, sufficient clearance is generated due to the differential thermal expansion to permit ready removal of the die plate. For example: in an embodiment such as depicted in FIGS. 1 and 2 when used for the extrusion of polystyrene, polyethylene and other like thermoplastics, cooling of the die with polymer therein presents no significant problem, as most thermoplastic materials do not adhere strongly to metals and sticking at room temperature is generally readily overcome with one or two gentle blows of a hammer, preferably a soft faced hammer such as brass, aluminum, lead or the like. Cooling of the die plate and/or warming of the die body may also be employed. A particularly advantageous combination of metal is stainless steel type 304 which has a linear thermal coefficient of expansion of $9.5 \times 10^{-6}$ inches per °F. and titanium alloy 6AE-4V having a linear thermal coefficient of expansion of $5.1 \times 10^{-6}$ inches per °F.

A die is fabricated generally as depicted in FIG. 1 wherein the die ring 23 has an outside diameter of 20.5 inches and an inner diameter of 19.877 inches. 120 extrusion openings are equally spaced about the periphery. The ring has a height of about five-eighths inch and is fabricated from titanium allow 6AE-4V. A die body such as the body 12a is fabricated from type 304 stainless steel and an external surface equivalent to the surface 19 has an outside diameter of 19.886 inches. (The foregoing dimensions are all at 70°F.) The ring is readily fitted to the die body. The die assembly is then supported on a motor and heated to about 400°F. and heat plastified polyethylene passed to the central portion thereof. The die performs the extrusion function in a satisfactory manner. After extrusion has been completed, the die is cooled to room temperature. The die ring is struck with a brass hammer to loosen the die ring from the cooled polymer and the ring is readily removed for cleaning.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

I claim:

1. An annular centrifugal extrusion die particularly suited and adapted for the extrusion of heat plastified synthetic resinous materials at an extrusion temperature at least 80°C. above ambient temperature, the extrusion die comprising in cooperative combination
an annular die body defining
a cavity therein, the die body defining
a passageway therein to permit entry therein of the heat plastified material,
an annular die plate defining a plurality of
extrusion orifices in operative combination with the die body, the die plate being disposed in generally sealable engagement peripherally about the die body, the die plate and die body being of materials having lower and higher coefficients of expansion, respectively, at ambient temperature, the die plate and die body being readily placed in mating relationship when the die body is at least 50°C. below the extrusion temperature, at the extrusion temperature the die body and die plate exhibiting an interference fit, the die body defining an
extrude receiving cavity, the extrude receiving cavity being in operative communication with the passageway and the extrusion orifices.

2. The extrusion die of claim 1 which has a generally discoidal configuration.

3. The extrusion die of claim 1 wherein the annular die plate is readily separable from the die body at ambient temperature.

* * * * *